May 21, 1946.	H. ST. PIERRE	2,400,855
STUD CHAIN LOCKING LINK
Filed Feb. 3, 1943
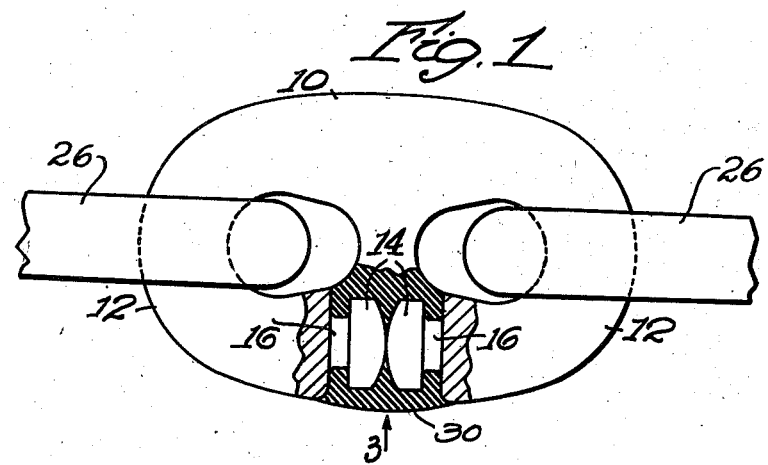
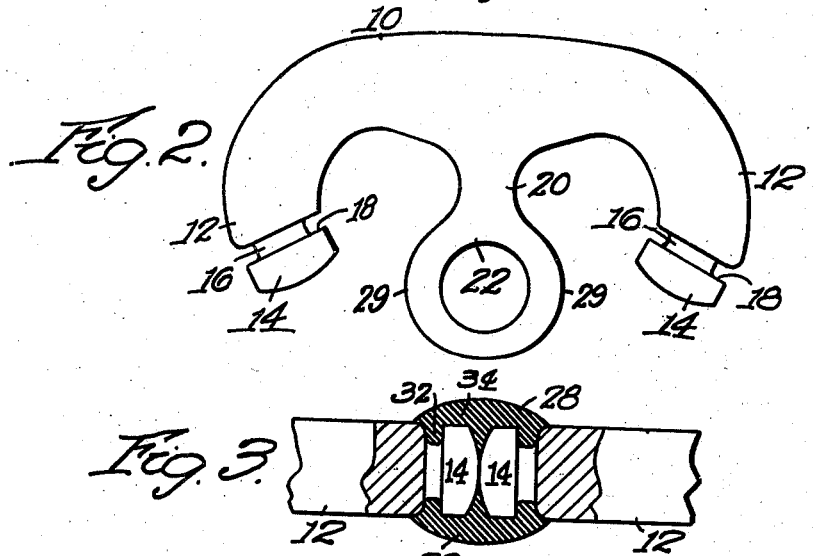
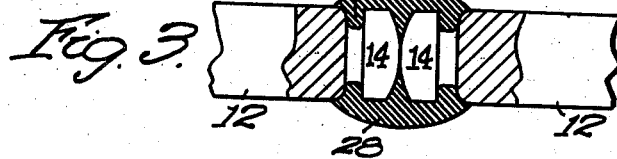
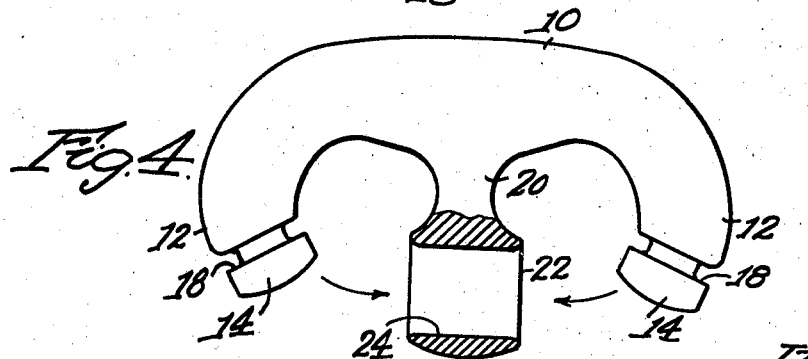
Inventor
Henry St. Pierre
by attorney
Charles R. Ray Patented May 21, 1946

2,400,855

UNITED STATES PATENT OFFICE 2,400,855

STUD CHAIN LOCKING LINK

Henry St. Pierre, Worcester, Mass.

Application February 3, 1943, Serial No. 474,570

4 Claims. (Cl. 59—84)

This invention relates to locking links of the stud type, and the objects of the invention include the provision of an improvement over the chain locking link of my Patent No. 2,277,567, dated March 24, 1942, by providing a stronger female connecting member and by providing a construction requiring less twisting in the ends of the link to close and assemble it.

Further objects of the invention include the provision of shorter and stronger male connecting portions and a shorter and stronger female connecting portion, the latter being in the form of a bulged ring which receives and secures the male connecting portions and has a greatly enlarged and stronger metal section by reason of the bulge, said female connecting portion being in the form of a cylinder or ring which is forged in one piece with the rest of the link and is twisted into position to receive the male connecting portions after assembly of a pair of solid links.

Other objects and advantages of the invention will appear hereinafter.

Reference is to be had to the accompanying drawing in which

Fig. 1 is a plan view of a link with parts in section;

Fig. 2 is a plan view of the link blank;

Fig. 3 is an edge view of the link showing the locking connection in section; and Fig. 4 illustrates the method of closing the link.

The link forming the illustration of the present invention is shown as of the stud type and has a solid run or side 10 having ends 12 forming the ends of the link. Ends 12 are curved around toward each other as the blank of Fig. 2 is forged, and the ends terminate in heads 14 at the ends of reduced necks 16, the latter forming locking shoulders 18. Heads 14 are seen to be at angle to each other, but are not located at as great an angle as the corresponding parts 16 in the above named patent.

A stud 20 is forged integrally with the solid side 10 and this stud terminates in a ringlike member 22 which is hollow and whose axis is at right angles to the plane of the link. As originally forged, member 22 has an internal hour glass shape, due to the draft necessary in the forging operation, but the waist portion may be punched out to present the more nearly uniform shape of the interior of this member as shown at 24. The punching operation also removes any fin which may be present in the interior of member 22, due to the action of the dies.

The length of member 22 may be less than the combined lengths of heads 14 and necks 16, or it may be approximately the same, but in any case, the solid links 26 are inserted in the eyes of the blank of Fig. 2, the member 22 is twisted 90° to lock the solid links in place, and ends 12 are moved up to bring heads 14 and necks 16 into the member 22 in approximately contacting relation with each other.

The member 22 is heated and forged in a die to flow material thereof into tight relation with the heads and necks, see Fig. 1, this locking the parts securely together. However, the member 22 is originally forged with a surplus of material and the final dies are shaped to utilize the extra metal for the lateral bulges shown at 28 in Fig. 3. This bulge extends substantially all around the heads 14 except at the stud side, the stud itself providing a thick connection section adjacent the heads 14, but the bulge is small, if at all present, at the edge aspect 30 in Fig. 1, so that no interference in running the chain will be present. In order to more readily obtain the desired bulge shape, the original shape of the member 22 may be oval as shown at 29 in Fig. 2.

This bulge provides an extra metal section at the point adjacent the heads, see 28, where the thinnest section of the female member is generally located, and thus the latter is greatly strengthened by reason of the bulge. Also, the section at the necks, as at 32, is not much if any greater than the section at the heads, as at 34, and the stud area is sufficient in section at the head region due to the lateral bulge for maximum strength. Hence, this invention provides a stronger locking link than heretofore, without, however, increasing the complexity of the link or the methods of making and assembling the chain, and due to the shorter male and female members, a less degree of swinging in or twisting of ends 12 is provided for, with consequent less distortion of the metal due to this operation.

Having thus described my invention and the advantages thereof, I do not wish to be limited to the details herein disclosed, otherwise than as set forth in the claims, but what I claim is:

1. A chain link comprising a solid side, a stud integral therewith and extending therefrom, a pair of arms at opposite sides of the stud, each arm having a shouldered connection element at its end, an enlarged hollow connection member on the stud securing the latter and said elements together, said elements extending into the hollow member from opposite ends thereof and being locked thereto by their shoulders, said connection member having an exterior bulged contour extending beyond the lateral confines of the arms adjacent the ends of the latter, said connection member bulged contour extending outwardly of the arms at the edge of the link but to a less degree than at the lateral surfaces of the link.

2. A locking link having a stud and a pair of arms adapted to be connected to said stud to form a pair of eyes in the link, and a connection between the stud and the arms comprising a ring-like member on the stud and a shouldered connection element on each arm, said elements being received in the member, said member having an exterior surface which is outwardly bulged from end to end of the member, said bulge being principally located laterally of the link at the sides thereof.

3. A locking link having a stud, a ring-like member on the stud, a pair of arms adapted to be secured to the stud, reduced necks and heads thereon on each arm, said heads extending into the ring-like member from opposite ends thereof so that said heads approach each other substantially centrally of the member, said necks being located adjacent the ends of the member, said ring-like member having a generally uniform bulged surface at the exterior thereof, said bulged surface being located principally at the sides of the links.

4. A locking link as recited in claim 3 wherein said ring-like member is generally cylindrical and the bulge is substantially uniform from end to end thereof, said member in part extending outwardly of the link arms by reason of the bulge.

HENRY ST. PIERRE.